INVENTOR.
JOSEPH CLIFFORD

July 8, 1969   J. CLIFFORD   3,453,903
GAS CHANGEOVER ADJUSTMENT MECHANISM FOR PRESSURE REGULATORS
Filed Aug. 9, 1967   Sheet 2 of 2

INVENTOR.
JOSEPH CLIFFORD
BY
*Han M. Staubly*
ATTORNEY

United States Patent Office 3,453,903
Patented July 8, 1969

3,453,903
GAS CHANGEOVER ADJUSTMENT MECHANISM FOR PRESSURE REGULATORS
Joseph Clifford, Corona, Calif., assignor to Honeywell Inc., Minneapolis, Minn., a corporation of Delaware
Filed Aug. 9, 1967, Ser. No. 659,490
Int. Cl. G05g 1/04
U.S. Cl. 74—526           5 Claims

ABSTRACT OF THE DISCLOSURE

A diaphragm valve controlled by an on-off three-way valve and a pressure regulator valve with adjustment mechanism, including a pair of screws in the body of the valve which provides a pair of operating limits for a temperature responsive bulb and bellows actuator that operates the three-way valve and variably loads the pressure regulator valve.

Background of the invention

Valves of the above mentioned type require different loadings for the pressure regulator when used to control liquid petroleum gas and natural or manufactured gas. It is old in the art to provide manually adjustable means which can be adjusted to change the regulating pressure setting, but in the prior art known to the inventor, there is no showing of readily adjustable means for a pressure regulator that provides two separate and selectively usable ranges of adjustment for use with the different types of gases.

Brief summary of invention

A natural gas-liquid petroleum gas changeover mechanism for a pressure regulator comprising adjustment means for limiting the loading of a pressure responsive control device, a first pair of stops and a pair of movable stops, an abutment on the adjustment means selectively and adjustably positionable between one each of said first and movable stops, and means for locking the movable stops with respect to the control device.

Detailed description

Figure 1:
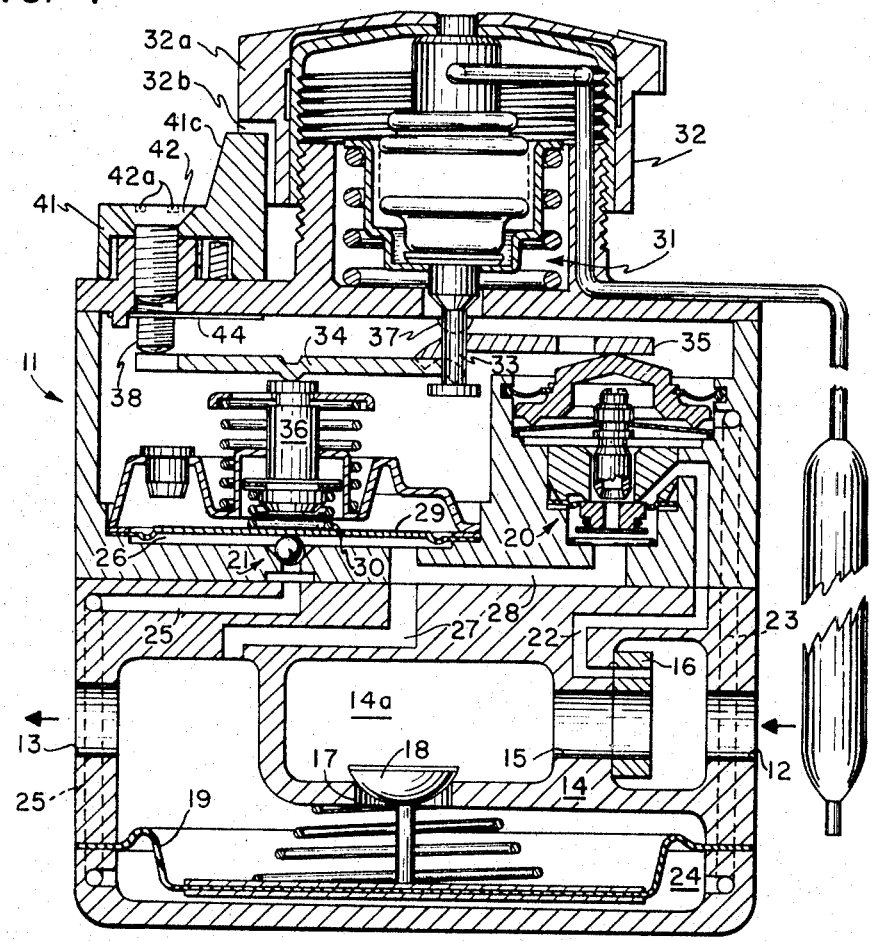
FIGURE 1 is a vertical sectional view of the invention.
Figure 2:
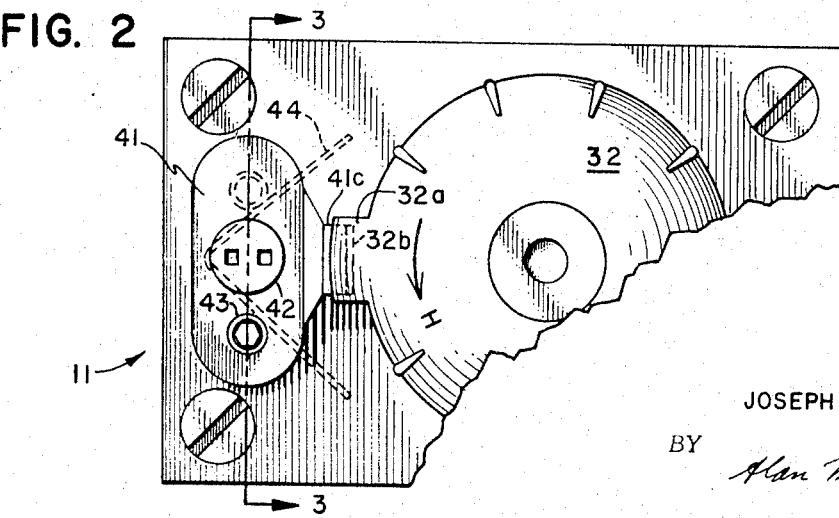
FIGURE 2 is a fragmentary plan view of the invention.
Figure 4:
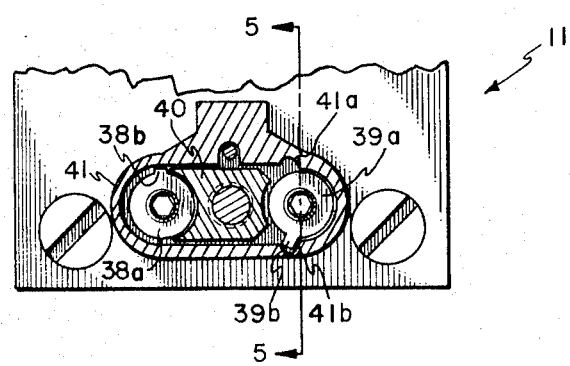
FIGURE 4 is a fragmentary and sectional view thereof taken along line 4—4 of FIGURE 3.
Figure 3:
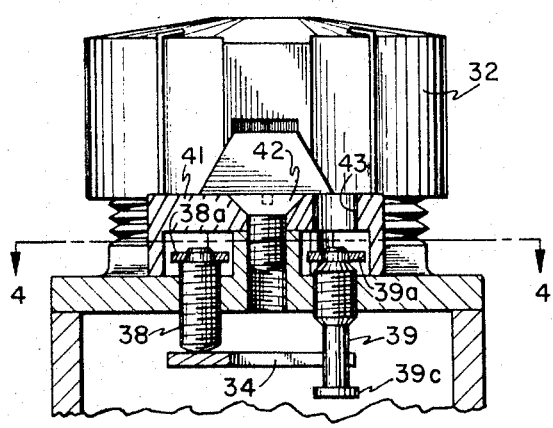
FIGURE 3 is a fragmentary and sectional view of the invention taken along line 3—3 of FIGURE 2.
Figure 5:
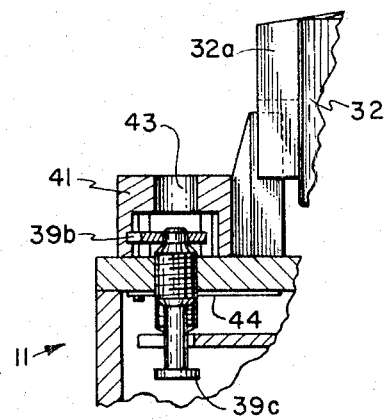
FIGURE 5 is a fragmentary and sectional view taken along line 5—5 of FIGURE 4.

The embodiment of the invention disclosed in the drawings comprises a valve body generally designated by a reference numeral 11 and having an inlet 12 and an outlet 13. Within the valve body is a partition wall 14 between the inlet and outlet which has a first aperture 15 leading to a chamber 14a and controlled by a manually operable safety valve 16. A second aperture 17, extending from the chamber 14a and through another portion of the partition wall, is controlled by a modulating valve 18 connected to a diaphragm 19.

Two diaphragm controller valves generally designated by the reference numerals 20 and 21 are located in a gas flow path formed by a passageway 22–23, pressure chamber 24, passageway 25, pressure chamber 26 and passageway 27 to the outlet chamber adjacent the outlet 13. A bleed passageway 28 extends from valve 20 to the outlet chamber through the passageway 27. The valve 21 is a pressure responsive operated ball valve which is actuated by a diaphragm 29 which is biased toward a valve closing position by a loading spring 30.

Both of the valves 20 and 21 are adapted to be actuated by a bulb and bellows power unit generally designated by the reference numeral 31. The fixed end of the bellows is adjustable by means of a knob 32 screw-threaded on a bellows housing on the valve body in a conventional manner. As illustrated, an abutment rib 32a has a groove 32b therein that receives a removable pointer, to be presently described, to lock the knob in one position, if it is so desired. Normally, the abutment rib is to one side of the pointer for adjustment purposes. The free end of the bellows operates through a headed stem 33 on a pair of levers 34 and 35. The head of the stem acts on one end of the lever 34 and pivots it about one end of the lever 35 with the intermediate portion of the lever 34 acting on a stem 36 that positions the relatively fixed end of the spring 30. The lever 35 pivots about a fixed pivot 37 on the inner surface of the valve body with the other end of the lever 35 operably engaging a snap-acting mechanism for the valve 20. The relative lengths of the pivot arms of the two levers is such that when the head of the bellows stem moves upwardly the lever 35 will first move clockwise about the pivot 37 to operate the snap-acting mechanism to move the snap-acting valve to a position, which permits gas flow from the inlet to the gas chamber 24, to actuate the valve 18. After the valve 20 has been thus moved, the lever 34 will be pivoted counterclockwise to variably load the spring 30 in accordance with the degree of temperature change determined by the bulb and bellows actuator, substantially as described in detail in United States Patent No. 3,307,785.

In order to limit the movement of the lever 34 between certain minimum and maximum positions, a screw 38 is threaded through the upper wall of body 11 with the inner end thereof positioned above the lever 34 so that the spring 30 will have a minimum loading to provide a minimum pressure regulation. A second screw 39 is similarly threaded through the upper wall of the valve body and has a head 39c on the inner end thereof which is positioned below the lever 34 so as to establish a maximum loading of the spring 30 to limit the maximum pressure adjustment for the valve 21. It is thus seen that by varying the positions of the inner ends of the screws 38 and 39, the minimum and maximum pressure adjustments for the control valve 21, and thus the minimum and maximum positions of the main modulating valve 18, may be regulated.

While it is generally preferable that these minimum and maximum adjustments be provided at the factory where the valve is made, it is frequently desirable that a limited amount of field adjustment be provided, for at least the maximum adjustment, when the valve is placed in a gas burner installation. However, since it is undesirable to provide unlimited adjustment of the valve in the field but it is desirable to be able to adjust the gas pressure controlled by the valve when the valve is used with liquid petroleum "LP" gas and when it is used to control natural gas or manufactured gas, no arrangement has heretofore been possible to satisfy all these needs.

By providing a head 38a with a radially extending abutment 38b on the screw 38 and a boss 40 on the upper surface of the valve body, the amount of field adjustment for the minimum rate screw 38 is limited to approximately 180° of rotation of the screw at which points the abutment 38b will engage one or the other side of the boss 40 arcuately positioned adjacent the head 38a.

By similarly providing a head 39a with a radially extending abutment 39b thereon, the angular rotation of the adjustment screw 39 is limited to approximately 270° at which points the abutment 39b will engage opposite sides of the other end of the boss 40. To provide two separate ranges of adjustment for the screw 39, one for LP gas and one for natural or manufactured gas, a cover 41 is provided with a recess therein that provides free movement of the screw 38 therein but has shoulders 41a and 41b that are engaged by the abutment 39b when the cover is in its position on the valve body. It is thus seen that the abutment 39b is limited in its movement between the end of the boss 40 and the abutment 41b or between the boss and the abutment 41a depending upon which side of the boss the abutment 39b is positioned. The shoulder 41b and boss 40 are used for limiting the movement of the abutment 39b when the valve is controlling the flow of LP gas, while the stop 41a and boss 40 are used for limiting the movement of the abutment 39b when natural or manufactured gas is being controlled.

The cover 41 is held on the valve body by means of a screw 42 extending through an opening in the cover 41. An aperture 43 is provided in the top of the cover in axial alignment with the screw 39 to permit the insertion of an instrument, to engage a nonround socket in the outer end of the screw 39, to provide for limited adjustment of the screw 39. If desired, the head of the screw 42 may have unusual engaging recesses therein, such as two spaced bores so that the adjustment of the screws 38 and 39 are less likely to be tampered with by an unskilled homeowner but requires the adjustment thereof by a skilled serviceman having the proper tools. Also, it is deemed to be apparent that it is a relatively easy matter to convert the valve from its use as a control device for one type of gas to that for a considerably different type, by merely removing the cover 41 swinging the abutment 39b to the opposite side of the boss 40 and then replacing the cover. It is also to be noted that the cover has an upwardly projecting portion 41c that serves the function of a reference pointer for the position of the knob 32, to indicate the temperature setting of the control device.

If desired, a spring wire 44 may be positioned to bear against the sides of the screws 38 and 39 to help hold them in their adjusted positions.

*Operation*

As the overall valve operation of the illustrated embodiment of the invention is generally the same as that disclosed in the above-mentioned Patent 3,307,785, it will suffice to say that as the temperature surrounding the bulb and bellows actuator lowers to a point below the setting of the actuator, the bellows will contract and cause movement of the levers 35 and 34 to actuate the three-way valve 20, to supply control gas to the diaphragm chamber 24, to cause the valve 18 to open. With the supplying of gas to the chamber 26 from the outlet chamber, the ball valve will open sufficiently to bleed some of the gas supplied to the outlet so as to maintain the position of the valve 18 at the degree necessary to maintain the outlet pressure at the minimum regulated pressure. Obviously, when the valve 20 moves to the opening position, the passage 28 is closed so that all gas from passageway 22 passes to the chamber 24. Should the temperature around the bulb reduce still more, the lever 34 will be actuated to additionally load the spring 30 and thus increase the amount of pressure needed to open the ball valve and thus increase the pressure in the diaphragm chamber 24 to open the valve 18 wider. Should the temperature around the bulb decrease still more, the maximum that the lever 34 will additionally load the spring 30 is limited by the end of the lever 34 striking the head 39c of the screw 39. This limits the gas pressure to the gas burner.

Once the temperature around the bulb has risen to the control point of the bulb and bellows, the reverse takes place in that the loading of the spring 30 gradually decreases to the minimum flow position followed by the movement of the lever 35 to permit the snap-acting mechanism to move the three-way valve to a position cutting off flow of gas to the chamber 24, whereupon the valve 18 closes.

If it becomes necessary to change a heating system from the use of LP gas to natural or manufactured gas, the screw 42 should be removed with a suitable tool, the cover 41 removed, the heads 38a and 39a rotated counter-clockwise to position the abutments 38b and 39b on the opposite sides of the boss 40, and the cover and screw replaced. A fine adjustment of the maximum pressure setting can then be made with a suitable tool through the opening 43.

The embodiments of the invention in which an exclusive property or right is claimed are defined as follows.

I claim:

1. In a control device having a body portion and controlling means movable between a plurality of controlling positions, the combination comprising adjustment means on the exterior of said device and having a portion extending into the interior of said body portion for engagement with said controlling means to limit its movement, abutment means on said adjustment means, first and second stop means cooperable with said abutment means, cover means for said adjustment means with an aperture therein substantially in line with said adjustment means to provide for manual adjustment of said adjustment means, third and fourth stop means on said cover means for cooperation with said abutment means and being selectively usable with said first and second stop means respectively to provide two distinct ranges of adjustment for said abutment means and usable one at a time, the adjustment requiring removal of the cover means to change the position of said adjustment means from one range of adjustment to the other range of adjustment.

2. The combination defined in claim 1 wherein said controlling means includes a pressure regulator with variable loading means and said adjustment means cooperates with said variable loading means to provide operating limits for said pressure regulator.

3. The combination defined in claim 1 wherein said first and second stop means are on said body portion of said control device.

4. The combination of claim 1 wherein said adjustment means is rotatable and said stop means are angularly disposed to cooperate with said abutment means to limit the rotary movement of said adjustment means.

5. The combination of claim 1 wherein said cover means has a combined stop and pointer thereon and wherein a second manually operable control point adjustment means is mounted on said body for additionally adjusting said controlling means and positioned to cooperate with said stop and pointer for adjusting the setting of the control device.

References Cited

UNITED STATES PATENTS

| 2,334,419 | 11/1943 | Landerholm | 74—526 |
| 2,472,176 | 6/1949 | Stern | 74—526 |
| 2,505,975 | 5/1950 | Landon. | |
| 3,052,264 | 9/1962 | Graham et al. | |
| 3,155,316 | 11/1964 | Branson et al. | |
| 3,176,107 | 3/1965 | Temple | 74—526 XR |
| 3,181,548 | 5/1965 | Kreuter. | |
| 3,307,785 | 3/1967 | Currie. | |

FRED C. MATTERN, JR., *Primary Examiner.*

JAMES A. WONG, *Assistant Examiner.*

U.S. Cl. X.R.,

236—80, 92